United States Patent
Mun et al.

(10) Patent No.: US 10,564,869 B2
(45) Date of Patent: Feb. 18, 2020

(54) MEMORY CONTROLLER AND STORAGE DEVICE INCLUDING THE SAME

(71) Applicant: SAMSUNG ELECTRONICS CO., LTD., Suwon-si, Gyeonggi-do (KR)

(72) Inventors: Kui-Yon Mun, Hwaseong-si (KR); Young-Wook Kim, Hwaseong-si (KR); Wan-Soo Choi, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/057,849

(22) Filed: Aug. 8, 2018

(65) Prior Publication Data

US 2019/0138233 A1    May 9, 2019

(30) Foreign Application Priority Data

Nov. 9, 2017    (KR) .................. 10-2017-0148713

(51) Int. Cl.
*G06F 3/06*    (2006.01)
(52) U.S. Cl.
CPC .......... *G06F 3/0625* (2013.01); *G06F 3/0659* (2013.01); *G06F 3/0679* (2013.01)
(58) Field of Classification Search
CPC ..... G06F 3/0625; G06F 3/0659; G06F 3/0679
See application file for complete search history.

(56) References Cited

U.S. PATENT DOCUMENTS

| | | | |
|---|---|---|---|
| 7,414,871 B2 | 8/2008 | Lee et al. | |
| 7,636,265 B2 | 12/2009 | Park et al. | |
| 7,898,871 B2 | 3/2011 | Byeon | |
| 9,443,600 B2 | 9/2016 | Ghalam et al. | |
| 9,449,702 B1 * | 9/2016 | Pinkovich | G01R 21/06 |
| 2011/0271036 A1 * | 11/2011 | Cheng | G06F 1/24 |
| | | | 711/103 |
| 2012/0023348 A1 | 1/2012 | Byom et al. | |
| 2014/0047200 A1 | 2/2014 | Isachar et al. | |
| 2015/0023116 A1 | 1/2015 | Lee et al. | |
| 2016/0162215 A1 * | 6/2016 | Jayaraman | G06F 3/0659 |
| | | | 711/103 |
| 2017/0090802 A1 | 3/2017 | Margetts et al. | |
| 2017/0125103 A1 | 5/2017 | Wong | |
| 2017/0220280 A1 * | 8/2017 | Rotbard | G06F 3/0625 |

* cited by examiner

*Primary Examiner* — Mohammed A Bashar
(74) *Attorney, Agent, or Firm* — Volentine, Whitt & Francos, PLLC

(57) ABSTRACT

A method of controlling memory devices of a memory controller, the memory devices including a plurality of memory dies, includes receiving at least one data operation request and a power budget from external of the memory controller; determining respective data operation times of the plurality of memory dies, wherein a power consumption due to at least one data operation in response to the at least one data operation request may be equal to or less than the power budget; and controlling the plurality of memory dies based on the data operation times.

17 Claims, 14 Drawing Sheets

MEMORY CONTROLLER AND STORAGE DEVICE INCLUDING THE SAME

CROSS-REFERENCE TO RELATED APPLICATION

A claim for priority under 35 U.S.C. § 119 is made to Korean Patent Application No. 10-2017-0148713, filed on Nov. 9, 2017, in the Korean Intellectual Property Office, the entire contents of which is hereby incorporated by reference.

BACKGROUND

The inventive concepts described herein relate to a memory controller, and more particularly to a method of controlling a memory device by a memory controller, and a storage device including the memory controller.

Semiconductor memory devices may be classified into volatile memory devices and nonvolatile memory devices. Although volatile semiconductor memory devices have fast read and write speeds, data stored in volatile semiconductor memory devices is lost when power supply is no longer provided. On the other hand, although read and write speeds may be slower in nonvolatile semiconductor memory devices, stored data is retained in nonvolatile semiconductor memory devices even when power supply is no longer provided.

As technology has advanced, electric devices have been designed to have a greater number of various components which typically include semiconductor memory devices. As such, the issue of power control has become of greater importance. Particularly, the occurrence of electrical spikes in devices, created when various components are simultaneously operated, needs to be addressed.

SUMMARY

Embodiments of the inventive concepts provide a method and apparatus for controlling data operations of a plurality of memory dies within a range of a provided power budget by a memory controller, and a storage device including the same.

Embodiments of the inventive concepts provide a method of controlling memory devices by a memory controller, the memory devices including a plurality of memory dies. The method includes receiving, by the memory controller, at least one data operation request and a power budget from external of the memory controller; determining, by the memory controller, respective data operation times of the plurality of memory dies, such that power consumption due to at least one data operation in response to the at least one data operation request may be equal to or less than the power budget; and controlling, by the memory controller, the plurality of memory dies based on the data operation times.

Embodiments of the inventive concepts further provide a storage device including a plurality of nonvolatile memory dies; and a memory controller. The memory controller is configured to receive a power budget and programming requests from external of the memory controller, and to transmit command signals different from each other to the plurality of nonvolatile memory dies based on the power budget and a number of the programming requests.

Embodiments of the inventive concepts still further provide a method of controlling memory devices by a memory controller, the memory devices including a plurality of memory dies. The method includes receiving, by the memory controller, at least one data operation request from external of the memory controller; determining, by the memory controller, data operation times of the plurality of memory dies, wherein power consumption due to at least one data operation according to the at least one data operation is based on a widest power spectrum of the plurality of memory dies; and controlling, by the memory controller, the plurality of memory dies based on the determined data operation times.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF THE EMBODIMENTS

Hereinafter, embodiments of the inventive concepts will be described in detail with reference to the attached drawings.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
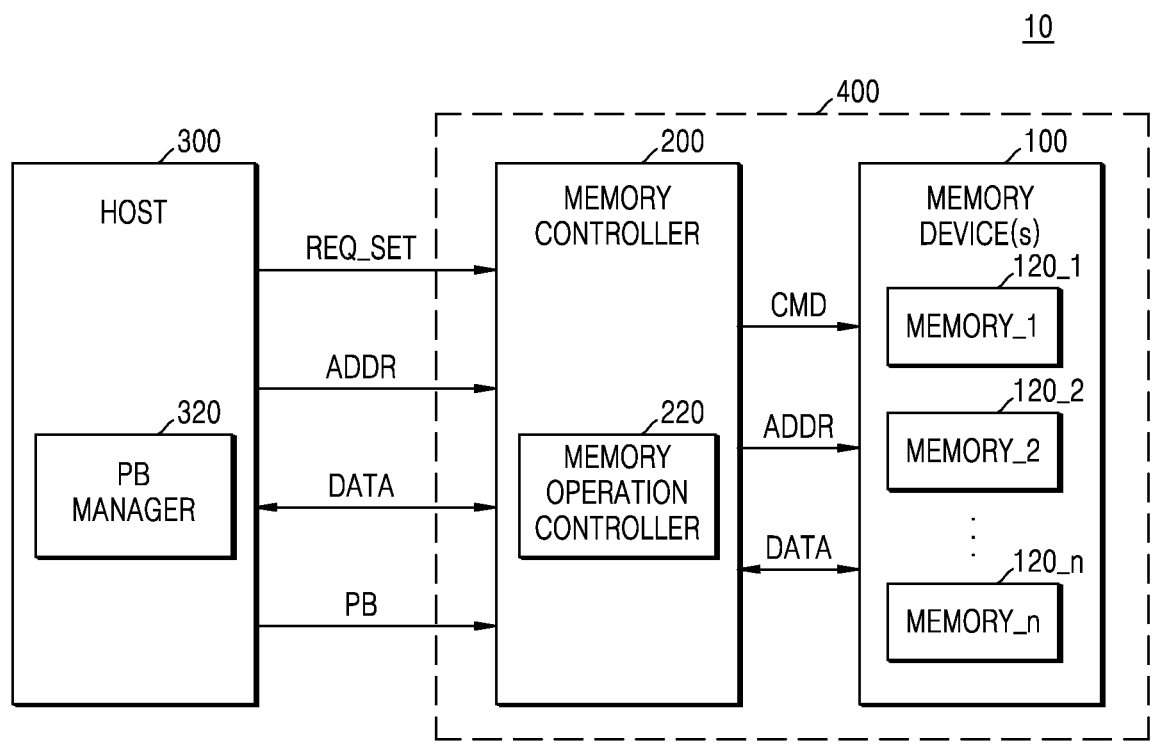
FIG. 1 illustrates a user system according to an embodiment of the inventive concepts.

FIG. 1 illustrates a user system 10 according to an embodiment of the inventive concepts. The user system 10 includes memory devices 100, a memory controller 200, and a host 300. The memory devices 100 and the memory controller 200 may be referred to as a memory system 400. The memory system 400 may be included in a single storage device. The user system 10 may be a computing system such as for example an ultra mobile PC (UMPC), a workstation, a net-book, a personal digital assistant (PDA), a portable computer, a web tablet, a wireless phone, a mobile phone, a smart phone, an e-book, a portable multimedia player (PMP), a handheld game console, a navigation system, a black box, a digital camera, a digital multimedia broadcasting (DMB) player, a digital audio recorder, a digital audio player, a digital picture recorder, a digital picture player, a digital video recorder, a digital video player, or the like. Accordingly, the user system 10 may include various other components in addition to the host 300 and the memory system 400.

The memory devices 100 may include n (n is a natural number) memory devices 120_1 through 120_n indicated respectively as Memory_1, Memory_2, . . . , Memory_n. The memory devices 120_1 through 120_n may be a plurality of respective memory dies 120_1 through 120_n, and in this case, the memory devices 100 may hereinafter be referred to as including the plurality of memory dies 120_1 through 120_n. The plurality of memory dies 120_1 through 120_n may perform operations such as programming, reading, and erasing of data, in response to signals received from the memory controller 200. The operations of programming, reading, and erasing may be referred to as data operations. Each of the memory dies 120_1 through 120_n may include at least one memory cell array. The memory cell array may include a plurality of memory cells arranged in an area where a plurality of word lines and a plurality of bit lines cross, and the plurality of memory cells may be nonvolatile memory cells. The plurality of memory dies 120_1 through 120_n may include NAND flash memory, vertical NAND (VNAND), NOR flash memory, resistive random access memory (RRAM), phase-change memory (PRAM), magnetoresistive random access memory (MRAM), ferroelectric random access memory (FRAM), spin transfer torque random access memory (STT-RAM), and combinations thereof.

The memory controller 200 may control the memory devices 100 in response to requests from the host 300. For example, the memory controller 200 may control the memory devices 100 to read data stored in the memory devices 100 or write data to the memory devices 100, in response to a data operation request set REQ_SET received from the host 300. The memory controller 200 may provide an address ADDR, a command CMD, and a control signal to the memory devices 100, thereby performing operations of programming, reading, and erasing on the memory devices 100. Furthermore, data DATA required for the operations may be transmitted and received between the memory controller 200 and the memory devices 100. The memory controller 200 may receive the data operation request set REQ_SET and a power budget PB from the host 300. The data operation request set REQ_SET may be a set including requests for data operations of the memory devices 100 controlled by the memory controller 200, and the power budget PB may indicate a largest amount of power consumption assigned to the memory system 400 by the host 300.

The memory controller 200 includes a memory operation controller 220. When the memory controller 200 controls data operations including the operations of programming, reading, and erasing data by using the memory devices 100, the memory operation controller 220 may determine data operation times required for the data operations, based on the data operation request set REQ_SET and the power budget PB received from the host 300. For example, when the data operation request set REQ_SET includes a plurality of data operation requests with respect to the plurality of memory dies 120_1 through 120_n, the memory operation controller 220 may control the data operation times so that power for the data operations performed by the plurality of memory dies 120_1 through 120_n is consumed within a range of the power budget PB. The memory controller 200 will be described in more detail with reference to FIG. 2, and the memory operation controller 220 will be described in more detail with reference to FIG. 5.

The host 300 may transmit the data operation request REQ_SET including the plurality of data operation requests, the address ADDR and the power budget PB to the memory controller 200, and may also exchange data DATA with the memory controller 200. For example, the host 300 may exchange data with the memory controller 200, based on at least one of various interface protocols such as for example universal serial bus (USB) protocol, Multi-Media Card™ (MMC) protocol, peripheral component interconnection (PCI) protocol, PCI-express (PCI-E) protocol, advanced technology attachment (ATA) protocol, parallel-ATA protocol, small computer system interface (SCSI) protocol, enhanced small disk interface (ESDI) protocol, integrated drive electronics (IDE) protocol, mobile industry processor interface (MIPI®) protocol, universal flash storage (UFS) protocol.

The host 300 includes a power budget manager 320. The host 300 may identify a total amount of power available for the user system 10, and may determine an amount of power that may be assigned to the memory system 400 from the identified total amount of power. The power budget manager 320 may transmit the power budget PB, which is allocated to the memory system 400, to the memory controller 200. The power budget PB transmitted from the host 300 may be a largest amount of power available for the memory system 400, and may also be a largest amount of current (e.g., operating current) or a largest amount of voltage (e.g., operating voltage) which may be allowed (or used) by the memory devices 100. The power budget PB may be provided to the memory controller 200 through a separate data line, but is not limited to transmission through a separate data line. For example, in other embodiments the power budget PB may be provided with the data operation request set REQ_SET or with data.

According to an example embodiment, the memory controller 200 may variably determine data operation times for data operations performed by the memory dies 120_1 through 120_n, based on the power budget PB received from the host 300 and the number of memory dies 120_1 through 120_n that are simultaneously operated. By variably determining the data operation times, the memory controller 200 may control a larger number of the memory dies 120_1 through 120_n to simultaneously perform data operations within a preset range of power budget PB.

Figure 2:
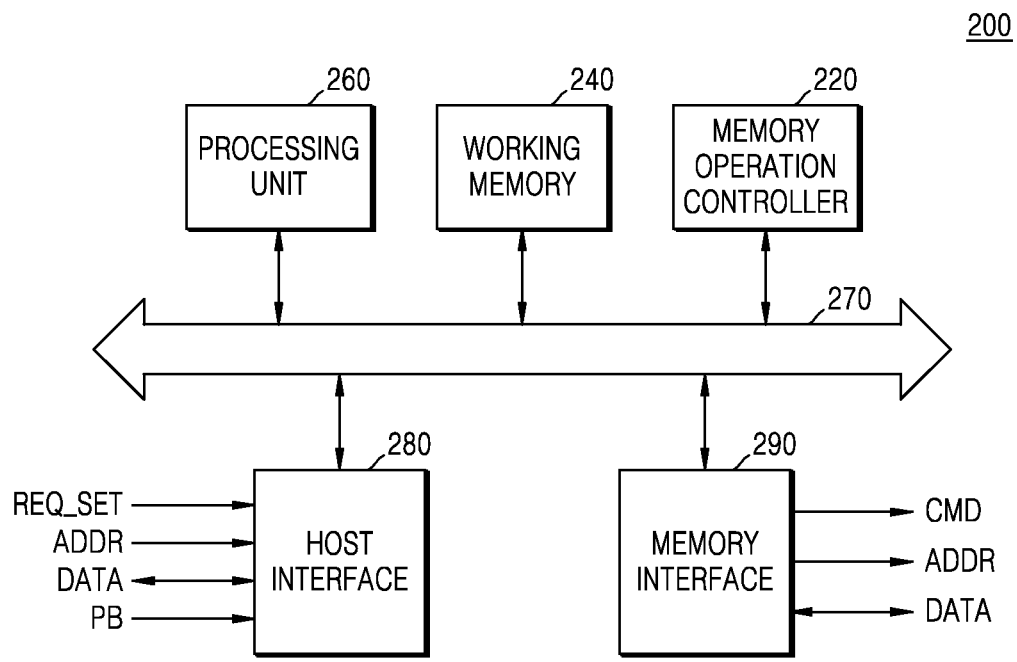
FIG. 2 illustrates a memory controller according to an embodiment of the inventive concepts.

FIG. 2 illustrates the memory controller 200 according to an embodiment of the inventive concepts. The memory controller 200 includes a memory operation controller 220, a working memory 240, a processing unit 260, a host interface 280, and a memory interface 290, and the above-stated components may exchange various data and/or signals through a bus 270. With respect to the memory controller 200, description overlapping with that of FIG. 1 may be omitted from the following.

The memory operation controller 220 may control the data operation times of the data operations performed in the memory devices 100 according to control of the memory controller 200. For example, when the memory controller 200 controls the data operations including the operations of programming, reading, and erasing data, the memory operation controller 220 may determine respective data operation times for the data operations, based on the data operation request set REQ_SET and the power budget PB received from the host 300. For example, under a certain power budget PB, the greater the number of data operations simultaneously required by the data operation request set REQ_SET is, the longer the data operation time determined by the memory operation controller 220 may be. The memory operation controller 220 will be described in more detail with reference to FIG. 5.

The processing unit 260 may include a central processing unit (CPU) or a micro-controller unit (MCU). The processing unit 260 may control overall operations of the memory controller 200. The processing unit 260 may execute firmware to control the memory controller 200, and the firmware to be executed may be loaded in the working memory 240.

The host interface 280 may provide an interface between the host 300 and the memory controller 200. The host 300 and the memory controller 200 may exchange data through one of various standard interfaces. The host 300 and the memory controller 200 may also exchange data through a plurality of interfaces from among various standardized interfaces. The memory controller 200 may receive the data operation request set REQ_SET, the address ADDR, and the power budget PB via the host interface 280 from the host 300, and may exchange data DATA with the host 300 via the host interface 280.

The memory interface 290 may provide an interface between the memory devices 100 and the memory controller 200. For example, data processed by the processing unit 260 may be stored in the memory devices 100 via the memory interface 290. Data stored in the memory devices 100 may be provided to the processing unit 260 via the memory interface 290. The memory controller 200 may transmit the command CMD and the address ADDR to the memory devices 100 via the memory interface 290, and may exchange data DATA with the memory devices 100 via the memory interface 290.

According to an example embodiment, the memory controller 200 may variably determine the respective data operation times of the data operations performed in the memory dies 120_1 through 120_n, based on the power budget PB received from the host 300 and the number of the memory dies 120_1 through 120_n that are simultaneously operated. For example, by variably determining the respective data operation times, the memory controller 200 may control a larger number of the memory dies 120_1 through 120_n to simultaneously perform the data operations within a certain range of the power budget PB.

Figure 3:
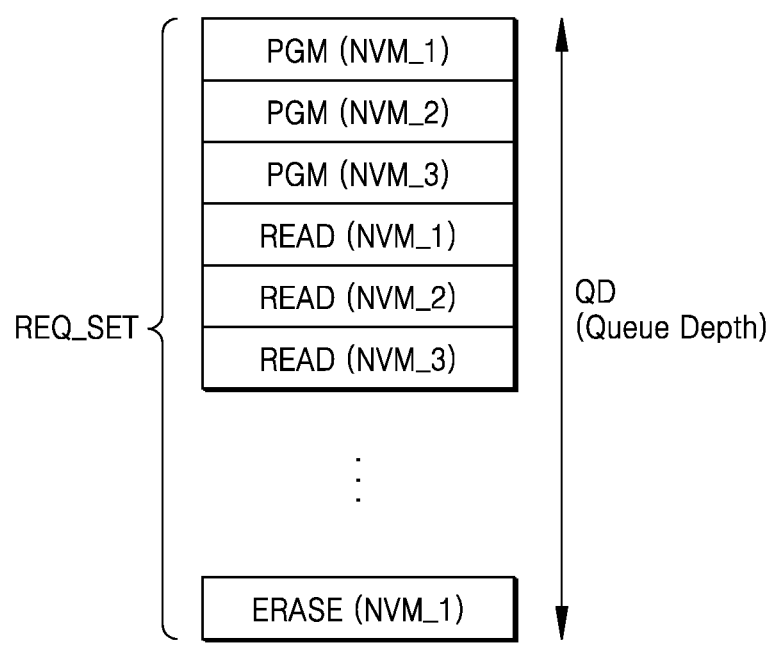
FIG. 3 illustrates a data operation request set according to an embodiment of the inventive concepts.

FIG. 3 illustrates the data operation request set REQ_SET according to an embodiment of the inventive concepts. FIG. 3 is described with reference to FIG. 1.

The host 300 may transmit the data operation request set REQ_SET to the memory controller 200. The data operation request set REQ_SET may include at least one data operation request. The data operation may be a term collectively referring to data input and output operations and a data erasing operation, and for example, the data operation may include a programming operation, a reading operation, and an erasing operation. The memory controller 200 may perform decoding on the data operation request set REQ_SET, and may perform the data operations by transmitting the command signal CMD to the memory devices 100, based on the decoded data operation request set REQ_SET.

The data operation request set REQ_SET may for example include a request PGM (NVM_1) to program data on a first nonvolatile memory die 120_1, a request PGM (NVM_2) to program data on a second nonvolatile memory die 120_2, a request PGM (NVM_3) to program data on a third nonvolatile memory die 120_3, a request READ (NVM_1) to read data from the first nonvolatile memory die 120_1, a request READ (NVM_2) to read data from the second nonvolatile memory die 120_2, a request READ (NVM_3) to read data from the third nonvolatile memory die 120_3, and a request ERASE (NVM_1) to erase data from the first nonvolatile memory die 120_1.

The number of the data operation requests included in the data operation request set REQ_SET may be referred to as a queue depth QD. According to an example embodiment, the memory controller 200 may variably control the respective data operation times for each of the data operations, according to the queue depth QD.

Figure 4:
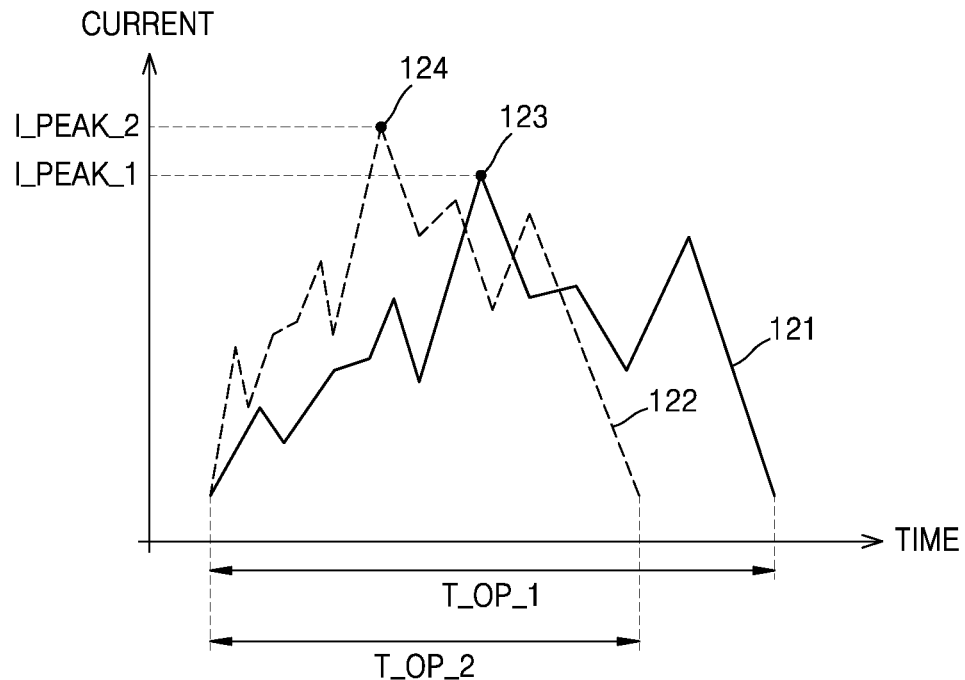
FIG. 4 illustrates a graph of a data operation current according to time, according to an embodiment of the inventive concepts.

FIG. 4 illustrates a graph of a data operation current according to time, according to an embodiment of the inventive concepts. FIG. 4 is described with reference to FIG. 1.

The memory controller 200 may control the data operations of the memory devices 100, according to the data operation request set REQ_SET received from the host 300. The memory controller 200 may control the data operation times, which are required to perform the data operations, to be variable. For example, the memory controller 200 may control the data operation to be performed on an arbitrary memory die from among the memory dies 120_1 through 120_n during the first data operation time T_OP_1, and in this case, a current graph of the arbitrary memory die according to time may be a first graph 121. As another example, the memory controller 200 may control the data operation to be performed on an arbitrary memory die from among the memory dies 120_1 through 120_n during the second data operation time T_OP_2, and in this case, a current graph of the arbitrary memory die according to time may be a second graph 122. The first data operation time T_OP_1 may be longer than the second data operation time T_OP_2.

The first graph 121 is a time-current graph of a memory die performing the data operation for the first data operation time T_OP_1. A current (e.g., operating current) of the memory die performing the data operation may have a largest amount at a first peak point 123 on the first graph 121. The largest amount of current at the first peak point 123 may be referred to as a first peak current I_PEAK_1.

The second graph 122 is a time-current graph of a memory die performing the data operation for the second data operation time T_OP_2. A current (e.g., operating current) of the memory die performing the data operation may have a largest amount at a second peak point 124 on the second graph 122. The largest amount of current at the second peak point 124 may be referred to as a second peak current I_PEAK_2.

Comparing the second peak current I_PEAK_2 to the first peak current I_PEAK_1, the second peak current I_PEAK_2 may have a larger amount than the first peak current I_PEAK_1. For example, when the arbitrary memory die performs the programming operation, the amount of peak current of the memory die may increase as programming time decreases.

The description with reference to the graph of FIG. 4 should not be limited to change in current according to time. For example, when a memory die performs a data operation, and when change in a voltage (e.g., operating voltage) according to time is graphically illustrated, it should be understood that a peak voltage value may increase as the data operation time decreases.

As the data operation times increase, a peak value of the current flowing on the memory die or the voltage applied to the memory die decreases, and it is thus possible to control the plurality of memory dies 120_1 through 120_n to simultaneously perform the data operations within a range of the assigned power budget, by controlling the data operation times to be variable.

Figure 5:
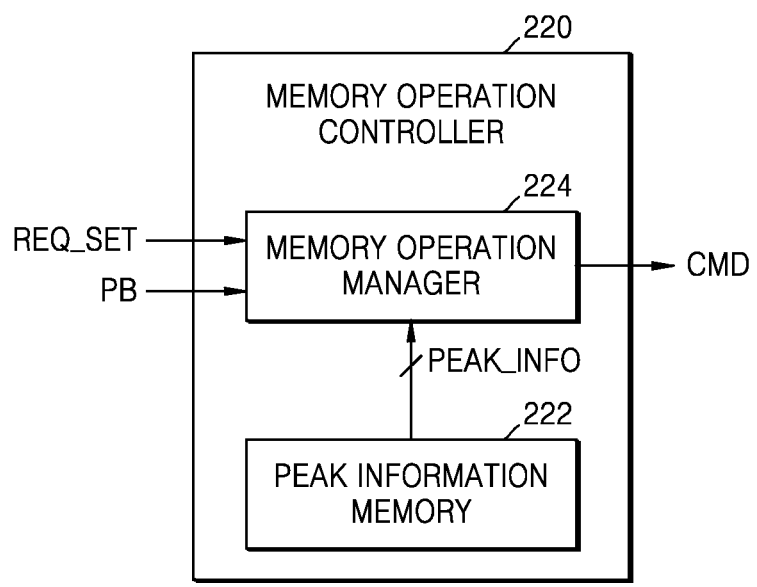
FIG. 5 illustrates a memory operation controller according to an embodiment of the inventive concepts.

FIG. 5 illustrates the memory operation controller 220 according to an embodiment of the inventive concepts. The memory operation controller 220 includes a peak information memory 222 and a memory operation manager 224. With respect to the memory operation controller 220, description overlapping with that of FIGS. 1 and 2 may be omitted from the following.

The peak information memory 222 may store peak information PEAK_INFO, and may provide the stored peak information PEAK_INFO to the memory operation manager 224. The peak information PEAK_INFO may include information regarding peak currents or peak voltages of the memory dies controlled by the memory controller. For example, the peak information PEAK_INFO may include information regarding the peak currents or the peak voltages according to the data operation times of the memory dies 120_1 through 120_n. The peak information PEAK_INFO may include information regarding peak currents or peak voltages according to the data operation times of the memory dies 120_1 through 120_n, for example, in the form of a data table indicating information regarding peak current values or peak voltage values corresponding to m (m is a natural number) pieces of data operation times. For example, the peak information PEAK_INFO may include peak current values or peak voltage values for various different data operation times. The peak information memory 222 may be a separate memory component but is not limited thereto. For example, in other embodiments the peak information memory 222 may include any component that may be a part of an arbitrary memory in the memory controller 200 and that may store the peak information PEAK_INFO. The peak information memory 222 and the peak information PEAK_INFO will be described in more detail with reference to FIG. 6.

The memory operation manager 224 may receive the peak information PEAK_INFO from the peak information memory 222, and may receive the data operation request set REQ_SET and the power budget PB received by the memory controller 200 from the host 300 via the host interface 280. The memory operation manager 224 may determine the data operation times of the memory dies 120_1 through 120_n based on the data operation request set REQ_SET and the power budget PB that have been received, and may generate a command signal CMD, based on the determined data operation times. The generated command signal CMD may be provided to the memory dies 120_1 through 120_n through the memory interface 290. The memory operation manager 224 may variably determine the data operation times of the memory dies 120_1 through 120_n so that a sum of power consumption, which is generated due to the data operations performed by the memory dies 120_1 through 120_n based on at least one data operation request included in the data operation request set REQ_SET, may be equal to or less than the power budget PB. For example, when the power budget PB is provided as a highest peak current value that may be allowed for the memory system 400, the memory operation manager 224 may determine the data operation times of the memory dies 120_1 through 120_n so that a sum of peak currents of the memory dies due to performances of the data operations may be equal to or less than the power budget PB. For example, the memory operation manager 224 may determine the number of the memory dies 120_1 through 120_n to simultaneously perform the data operations based on the data operation request set REQ_SET, and as the number of the memory dies being simultaneously operated increases, the memory operation manager 224 may determine the data operation times to be longer, so that a sum of the peak currents may be equal to or less than the power budget PB. The memory operation manager 224 may generate variable command signals CMDs, based on the determined data operation times. Operations of the memory operation manager 224 will be described in more detail with reference to FIGS. 9A through 9C, 11, and 13.

According to an example embodiment, the memory operation controller 220 may more efficiently control the data operations of the memory dies 120_1 through 120_n, by determining the respective data operation times of the memory dies 120_1 through 120_n in a way in which a sum of power consumed by the plurality of memory dies 120_1 through 120_n is equal to or less than the power budget PB.

Figure 6:
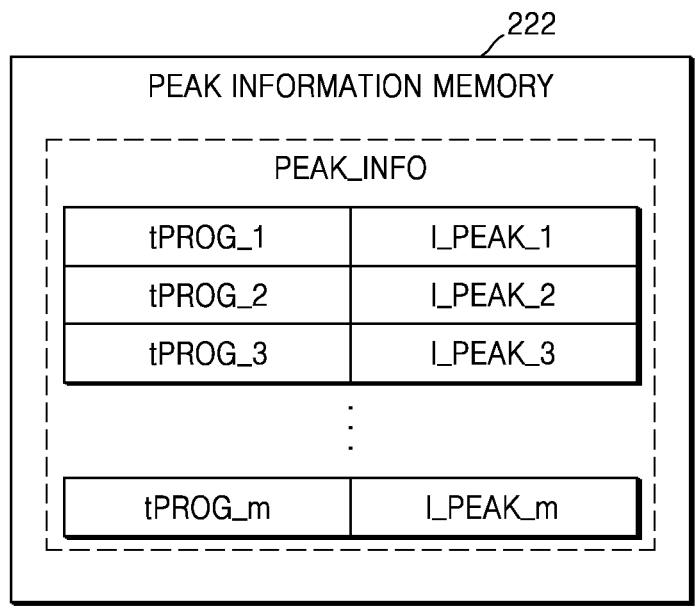
FIG. 6 illustrates a peak information memory according to an embodiment of the inventive concepts.

FIG. 6 illustrates the peak information memory 222 according to an embodiment of the inventive concepts. With respect to the peak information memory 222, description overlapping with that of FIG. 5 may be omitted from the following.

The peak information memory 222 may store the peak information PEAK_INFO to be provided to the memory operation manager 224 included in the memory operation controller 220. The peak information PEAK_INFO may indicate a value of a peak current or a peak voltage according to the data operation times of the memory dies 120_1 through 120_n. For example, the peak information PEAK_INFO may include a data table, which indicates information regarding peak current values corresponding to m (m is a natural number) pieces of data operation times.

For example, the peak information PEAK_INFO may include a data table, which indicates information regarding peak current values corresponding to m (m is a natural number) pieces of programming times. For example, when a memory die performs a programming operation for a first programming time tPROG_1, a first peak current I_PEAK_1 may flow through the memory die. Likewise, when the memory die performs the programming operation for second through $m^{th}$ programming times tPROG_2 through tPROG_m, respective second through $m^{th}$ peak currents I_PEAK_2 through I_PEAK_m may flow through the memory die.

The peak information memory 222 may provide the stored peak information PEAK_INFO to the memory operation manager 224 in the memory operation controller 220, and the memory operation manager 224 may variably control the data operation times of the memory dies 120_1 through 120_n based on the received peak information PEAK_INFO.

Figure 7:
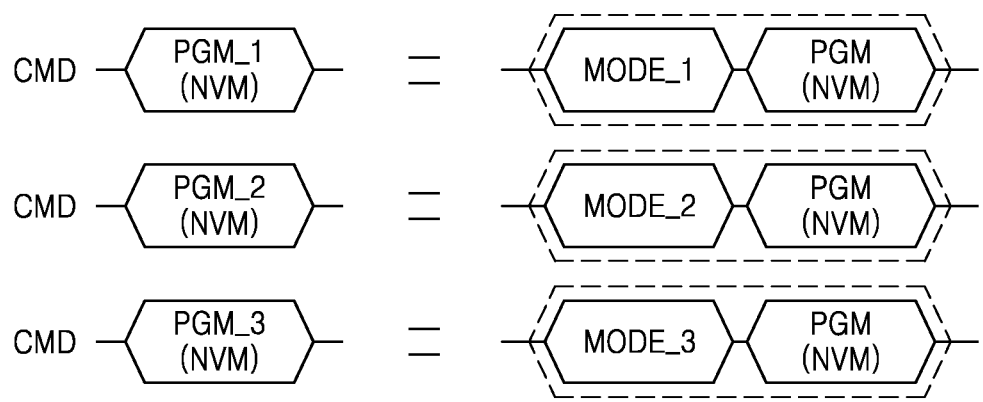
FIG. 7 illustrates command signals according to an embodiment of the inventive concepts.

FIG. 7 illustrates command signals CMDs according to an embodiment of the inventive concepts. FIG. 7 is described with reference to FIG. 6. Although the command signals CMDs for programming operations will be described with reference to FIG. 7, FIG. 7 illustrates an embodiment given merely as an example for convenience of explanation. For example, description with reference to FIG. 7 may also be applied to other data operations such as a data reading operation or an erasing operation.

Referring to the peak information PEAK_INFO of FIG. 6, a memory die from among the memory dies 120_1 through 120_n may perform the programming operation for the first programming time tPROG_1. The programming operation performed for the first programming time tPROG_1 is referred to as a first programming operation. Likewise, a programming operation performed for a second programming time tPROG_2 is referred to as a second programming operation, and a programming operation performed for a third programming time tPROG_3 is referred to as a third programming operation. The command signals CMDs that the memory controller 200 transmits to the memory die to have the memory die perform the first programming operation, the second programming operation, or the third programming operation, may be different from one another.

For example, a command signal CMD transmitted from the memory controller 200 to the memory die to have the memory die perform the first programming operation may be a first programming operation command signal PGM_1. The first programming operation command signal PGM_1 may be a signal generated by combining a first mode signal MODE_1 which indicates the first programming operation, with a programming command signal PGM. However, the combination is not limited thereto, and the first mode signal MODE_1 may be combined with the program command signal in the following manner, or may be included among the program command signals. When the memory die receives the first programming operation command signal PGM_1, the memory die may perform a programming operation for the first programming time tPROG_1, based on the first mode signal MODE_1 included in the first programming operation command signal PGM_1.

Likewise, a second programming operation command signal PGM_2 may be a signal generated by combining a second mode signal MODE_2, which indicates a second programming operation, with the programming command signal PGM. The second programming operation command signal PGM_2 commands the memory die to perform the programming operation for the second programming time tPROG_2. In addition, a third programming operation command signal PGM_3 may be a signal generated by combining a third mode signal MODE_3, which indicates a third programming operation, with the programming command signal PGM. The third programming operation command signal PGM_3 commands the memory die to perform the programming operation for the third programming time tPROG_3. The memory dies may perform the programming operations, by variably applying the programming times based on the mode signals combined with the received programming command signals.

Figure 8:
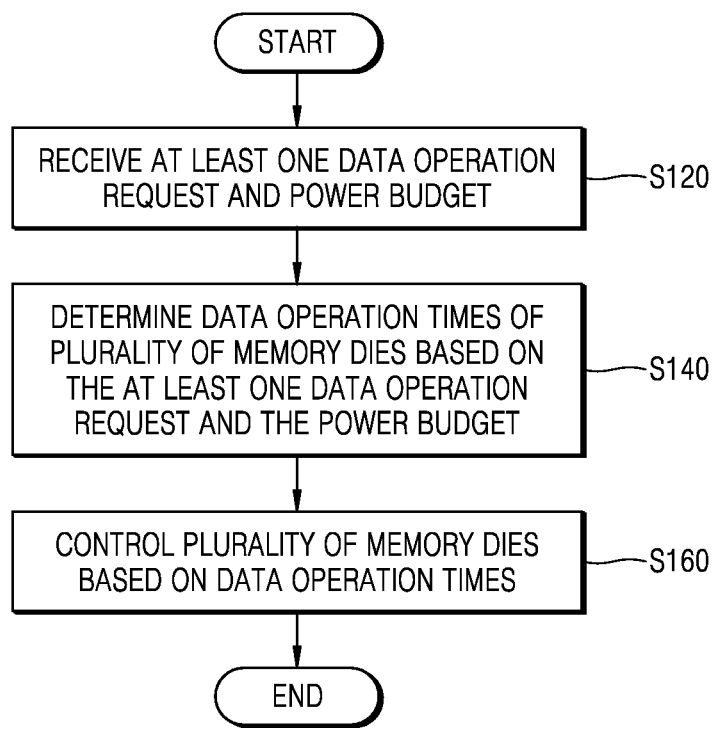
FIG. 8 illustrates a flowchart of a method of controlling the memory device by using the memory controller, according to an embodiment of the inventive concepts.

FIG. 8 illustrates a flowchart of a method of controlling the memory device 100 by using the memory controller 200, according to an embodiment of the inventive concepts. FIG. 8 may be described with reference to FIG. 1.

The memory controller 200 receives at least one data operation request and a power budget PB from external of the memory controller 200 (S120). For example, the memory controller 200 may receive the data operation request set REQ_SET, which includes at least one data operation request, and the power budget PB, from the host 300.

The memory controller 200 determines data operation times of the memory dies based on the at least one data operation request and the power budget (S140). For example, the memory controller 200 determines data operation times of the memory dies so that power consumption due to at least one data operation in response to at least one data operation request may be equal to or less than the power budget PB. For example, the memory controller 200 determines the data operation times of the memory dies to limit power consumption due to at least one data operation in response to the at least one data operation request to be equal to or less than the power budget PB. The power budget PB may indicate an acceptable highest peak current value or an acceptable highest peak voltage value that may be allowed, and in this case, the memory controller 200 may determine data operation times so that a sum of the peak currents or peak voltages of each of the memory dies from among the memory dies 120_1 through 120_n performing the data operations may be equal to or less than the power budget PB.

The memory controller 200 may determine memory dies to simultaneously operate among the plurality of memory dies 120_1 through 120_n, in response to the at least one received data operation request, and may determine a shortest period of time in which the memory dies simultaneously operate within the power budget PB as a data operation time. For example, with an increase in the queue depth, which indicates the number of at least one data operation requests, memory dies which simultaneously operate also increase. In such a case, the memory controller 200 may therefore determine the data operation time to be short. The aforementioned data operations may include a programming operation, a reading operation, and an erasing operation, and the like.

The memory controller 200 controls the plurality of the memory dies, based on the determined data operation time (S160). For example, the memory controller 200 may transmit command signals corresponding to the determined data operation time to the plurality of memory dies, thereby controlling the memory dies. When pieces of determined data operation time are different from one another, the command signals transmitted from the memory controller 200 may also be different from one another. For example, when the data operation time for the memory dies are different from one another, mode signals included in the command signals may be different from one another. The command signals may be described in more detail with reference to FIGS. 9A-9C.

Figure 9A:
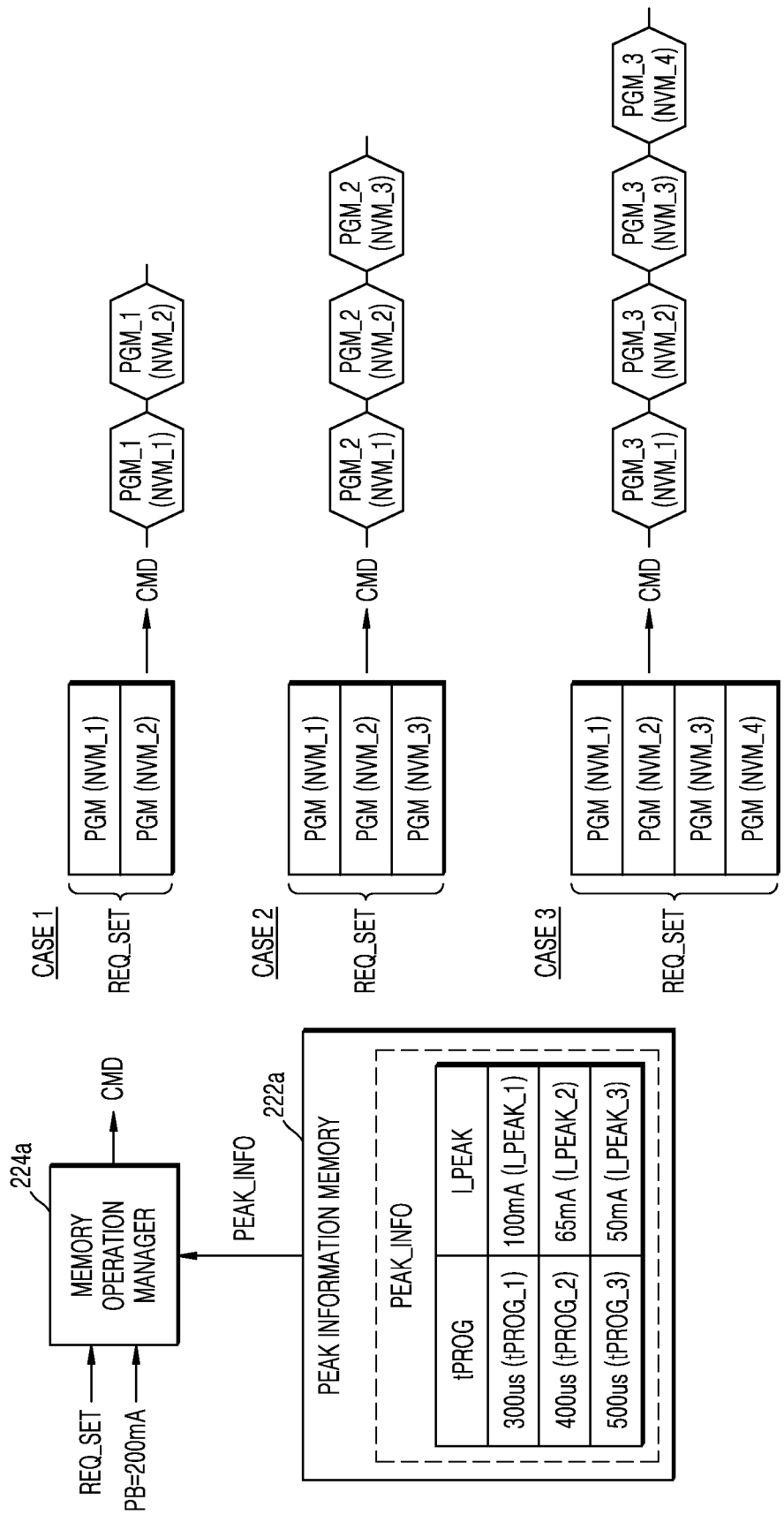
FIG. 9A illustrates operations of controlling the memory device according to an embodiment of the inventive concepts.

FIG. 9A illustrates operations of controlling the memory devices 100 according to an embodiment of the inventive concept. With respect to the data operation request set REQ_SET, a memory operation manager 224a, a peak information memory 222a, and the command signals CMDs, description overlapping with that of FIGS. 5 through 7 may be omitted from the following. An amount of the power budget PB, the peak information PEAK_INFO, and the data operation request set REQ_SET presented in FIG. 9A are merely values and cases set for convenience of explanation about operations of the memory controller 200 that determines the data operation time, and the inventive concepts are not limited to the values and cases presented in FIG. 9A.

The peak information memory 222a may store the first through third peak current values I_PEAK_1 through I_PEAK_3 respectively corresponding to the first through third programming times tPROG_1 through tPROG_3 as the peak information. The memory operation manager 224a may receive the peak information PEAK_INFO from the peak information memory 222a, and the power budget PB received by the memory operation manager 224a (e.g., from the host 300) may have 200 mA set as a highest peak current value that may be allowed for the memory system 400. According to the data operation request set REQ_SET received by the memory operation manager 224a (e.g., from the host 300), the memory operation manager 224 may differently determine data operation time, and may generate command signals CMDs different from one another, based on the determined data operation time.

In a first case CASE 1, the data operation request set REQ_SET may include a request to program the first nonvolatile memory die PGM (NVM_1) (e.g., memory die 120_1 in FIG. 1), and a request to program the second nonvolatile memory die PGM (NVM_2) (e.g., memory die 120_2 in FIG. 1). The memory operation manager 224a may determine the number of the memory dies to be simultaneously programmed to be two. The memory operation manager 224a may determine a shortest period of operation time, in which the two memory dies may perform the programming operation within the power budget PB of 200 mA, to be data operation times of the two memory dies. As the data operation response to the data operation request set REQ_SET is the programming operation, the data operation times may be programming times. For example, even if a peak current of 100 mA flows through each of the two nonvolatile memory dies NVM_1 and NVM_2 during programming, as a sum of the peak currents is equal to or less than 200 mA, which is the amount of the power budget PB in this case, the programming time for each of the nonvolatile memory dies may be determined as 300 μs, which is the first programming time tPROG_1. The memory operation manager 224a may transmit the first programming operation command signal PGM_1 to the first nonvolatile memory die NVM_1 and transmit the first programming operation command signal PGM_1 to the second nonvolatile memory die NVM_2, based on the determined programming time. In this case, the first programming operation command signal PGM_1 may be a command which controls the memory die to perform the programming operation for the first programming time tPROG_1.

In a second case CASE 2, the data operation request set REQ_SET may include a request to program the first nonvolatile memory die PGM (NVM_1), a request to program the second nonvolatile memory die PGM (NVM_2), and a request to program the third nonvolatile memory die PGM (NVM_3) (e.g., a memory die 120_3 of FIG. 1). The memory operation manager 224a may determine the number of the memory dies to be simultaneously programmed to be three. The memory operation manager 224a may determine a shortest period of operation time, in which the three memory dies may perform the programming operation within the power budget PB of 200 mA, to be a data operation time. As the data operation in response to the data operation request set REQ_SET is the programming operation, the data operation time may be the programming time. For example, although the first peak current I_PEAK_1 may not be allowed for each of the three nonvolatile memory dies, when a peak current of 65 mA which is a second peak current I_PEAK_2 is allowed, a sum of the peak currents is equal to or less than 200 mA, which is the power budget PB. The programming time for each of the nonvolatile memory dies may thus be determined to be 400 μs, which is the second programming time tPROG_2. The memory operation manager 224a may transmit the second programming operation command signal PGM_2 to the first nonvolatile memory die NVM_1, transmit the second programming operation command signal PGM_2 to the second nonvolatile memory die NVM_2, and transmit the second programming operation command signal PGM_2 to the third nonvolatile memory die NVM_3, based on the determined programming time. In this case, the second programming operation command signal PGM_2 may be a command signal which controls the memory die to perform the programming operation for the second programming time tPROG_2.

In a third case CASE 3, the data operation request set REQ_SET may include a request to program the first nonvolatile memory die PGM (NVM_1), a request to program the second nonvolatile memory die PGM (NVM_2), a request to program the third nonvolatile memory die PGM (NVM_3), and a request to program a fourth nonvolatile memory die PGM (NVM_4) (e.g., a memory die 120_4 of FIG. 1). The memory operation manager 224a may determine the number of the memory dies to be simultaneously programmed to be four. The memory operation manager 224a may determine a shortest period of operation time, in which the four memory dies may perform the programming operation within the power budget PB of 200 mA, to be a data operation time. As the data operation response to the data operation request set REQ_SET is the programming operation, the data operation time may be the programming time. For example, although the second peak current I_PEAK_2 may not be allowed for each of the four nonvolatile memory dies, when a peak current of 50 mA which is a third peak current I_PEAK_3 is allowed, a sum of the peak currents is equal to or less than 200 mA, which is the power budget PB. The programming time for each of the nonvolatile memory dies thus may be determined to be 500 μs, which is the third programming time tPROG_3. The memory operation manager 224 may transmit the third programming operation command signal PGM_3 to the first nonvolatile memory die NVM_1, transmit the third programming operation command signal PGM_3 to the second nonvolatile memory die NVM_2, transmit the third programming operation command signal PGM_3 to the third nonvolatile memory die NVM_3, and transmit a fourth programming operation command signal PGM_4 to the fourth nonvolatile memory die NVM_4, based on the determined programming time. In this case, the third programming operation command signal PGM_3 may be a command signal which controls the memory die to perform the programming operation for the third programming time tPROG_3.

As an additional embodiment to secure a greatest capacity of programming, the memory operation manager 224a may compare whether an overall capacity of a case, like the third case CASE 3, in which four memory dies are simultaneously programmed using the third programming time tPROG_3, is better than an overall capacity of a case in which two memory dies are simultaneously programmed using the first programming time tPROG_1. In addition, when the capacity of the case in which the four memory dies are simultaneously programmed is better, the memory operation manager 224 may determine the third programming time tPROG_3 as data operation time.

According to an example embodiment, the memory controller 200 may efficiently control the data operations of the memory dies within the range of the allowed power budget PB, by variably controlling the data operation time according to the number of the memory dies that simultaneously operate.

Figure 9B:
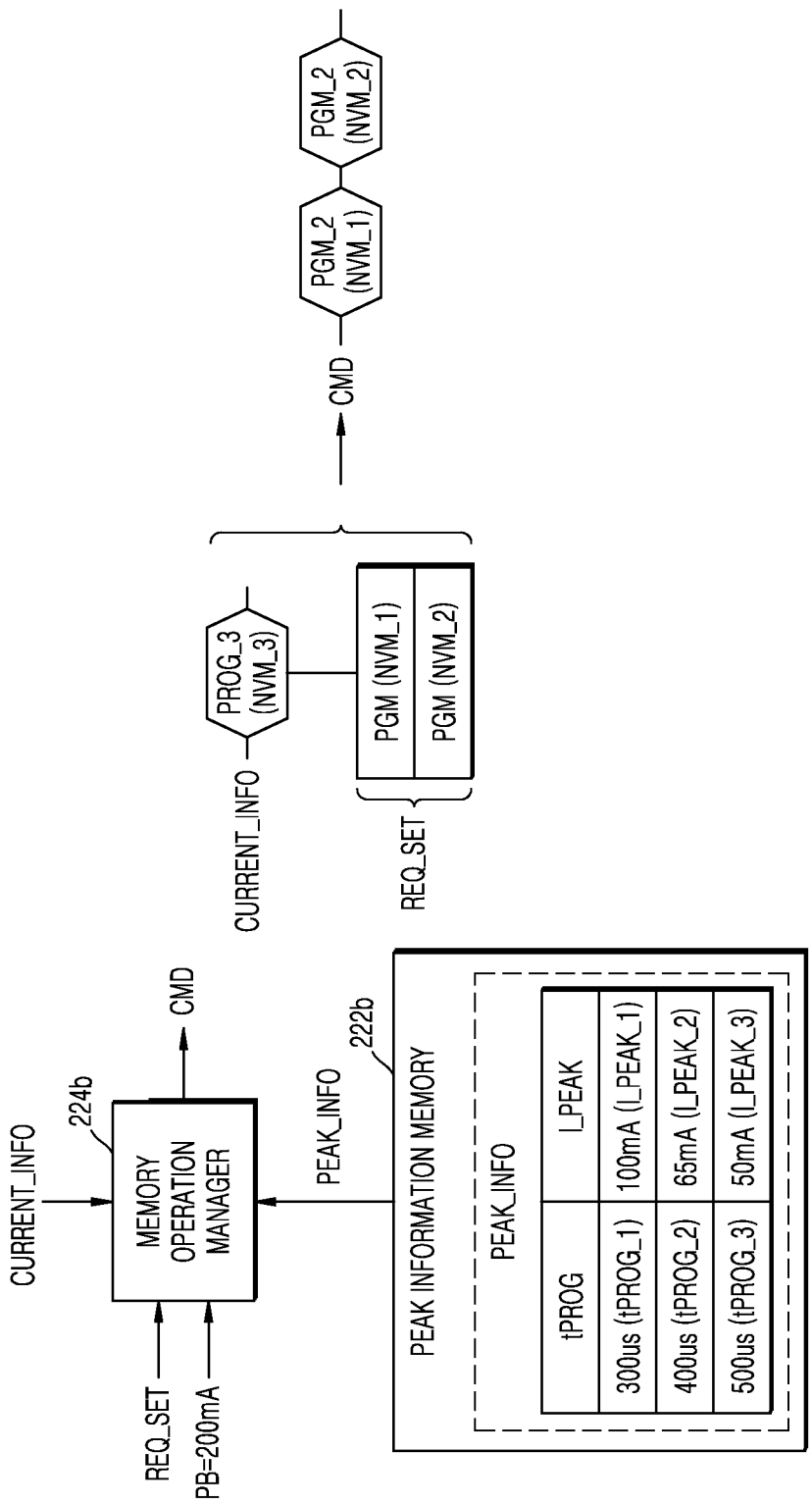
FIG. 9B illustrates operations of controlling the memory device according to an embodiment of the inventive concepts.

FIG. 9B illustrates operations of controlling the memory device 100 according to an embodiment of the inventive concepts. With respect to the data information request set REQ_SET, a memory operation manager 224b, a peak information memory 222b, and the command CMD, description overlapping with that of FIGS. 5 through 7 may be omitted from the following. An amount of the power budget PB, the peak information PEAK_INFO, and the data operation request set REQ_SET presented in FIG. 9B are merely values and cases set for convenience of explanation about operations of the memory controller 200 which determines the data operation time, and the inventive concepts are not limited to the values and cases presented in FIG. 9B.

The peak information memory 222b may store the first through third peak current values I_PEAK_1 through I_PEAK_3 respectively corresponding to the first through third programming times tPROG_1 through tPROG_3 as the peak information. The memory operation manager 224b may receive the peak information PEAK_INFO from the peak information memory 222b, and the power budget PB received by the memory operation manager 224b may have 200 mA set as a highest peak current value that may be allowed for the memory system 400. The memory operation manager 224b may determine data operation time considering (i.e., based on) current operation information CURRENT_INFO, and may generate command signals CMDs different from one another, based on the determined data operation times.

For example, the memory operation manager 224b may determine data operation time considering current operation information indicating a current performance of the third programming operation on the third nonvolatile memory die. In other words, the memory operation manager 224b may determine data operation times based on operation information indicative of an ongoing performance of the third programming operation on the third nonvolatile memory device NVM_3 underway at that time. The data operation request set REQ_SET may include a request to program the first nonvolatile memory die PGM (NVM_1), and a request to program the second nonvolatile memory die PGM (NVM_2). In this case, programming of the first and second nonvolatile memory dies must be performed within a range of 150 mA, which is a value determined by the memory operation manager 224b by subtracting 50 mA (which is the third peak current I_PEAK_3 flowing through the third nonvolatile memory die NVM_3 that is currently operating) from the provided power budget PB of 200 mA. The memory operation manager 224b may thus determine programming time for the first nonvolatile memory die and the second nonvolatile memory die.

For example, the memory operation manager 224b may in other words determine a shortest period of operation time of the two nonvolatile memory dies NVM_1 and NVM_2 that operate simultaneously as the data operation times, based on operations currently being performed on the nonvolatile memory die NVM_3, and so that power consumption of the two nonvolatile memory dies NVM_1 and NVM_2 that simultaneously operate is within a range not greater than the power budget PB minus power consumption due to the operation currently being performed on nonvolatile memory die NVM_3.

For example, although the first peak current I_PEAK_1 may not be allowed for each of the two nonvolatile memory dies NVM_1 and NVM_2, when the peak current of 65 mA which is the second peak current I_PEAK_2 is allowed, the sum of the peak currents of the two nonvolatile memory dies NVM_1 and NVM_2 is equal to or less than 150 mA. The programming time of the nonvolatile memory dies NVM_1 and NVM_2 may thus be determined to be 400 µs, which is the second programming time tPROG_2. The memory operation manager 224a may transmit the second programming operation command signal PGM_2 to the first nonvolatile memory die NVM_1, and transmit the second programming operation command signal PGM_2 to the second nonvolatile memory die NVM_2, based on the determined programming time.

Figure 9C:
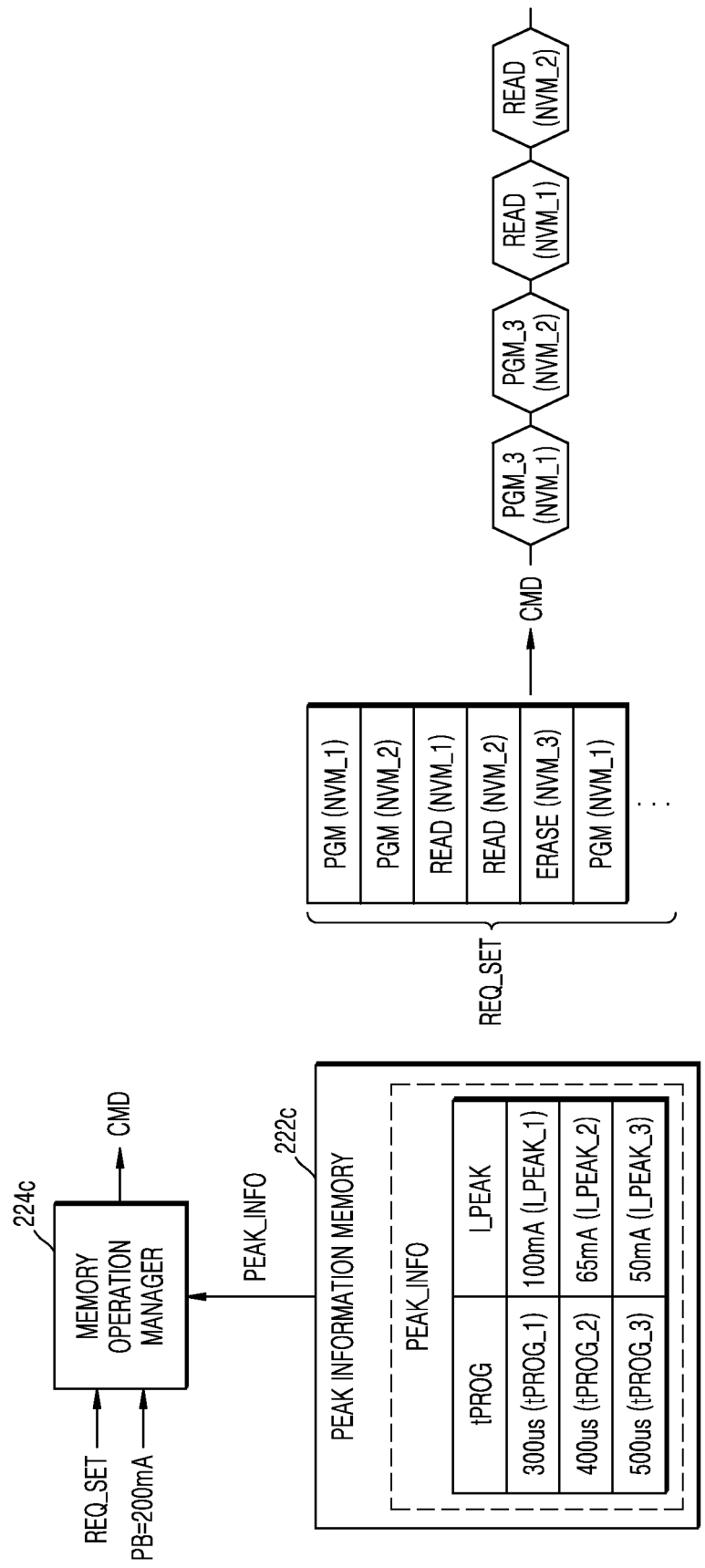
FIG. 9C illustrates operations of controlling the memory device according to an embodiment of the inventive concepts.

FIG. 9C illustrates operations of controlling the memory device 100 according to an embodiment of the inventive concepts. With respect to the data operation request set REQ_SET, a memory operation manager 224c, a peak information memory 222c, and the command signal CMD, description overlapping with that of FIGS. 5 through 7 may be omitted from the following. An amount of the power budget PB, the peak information PEAK_INFO, and the data operation request set REQ_SET presented in FIG. 9C are merely values and cases set for convenience of explanation about operations of the memory controller which determines data operation time, and the inventive concepts are not limited to the values and cases presented in FIG. 9C.

The peak information memory 222c may store the first through third peak current values I_PEAK_1 through I_PEAK_3 respectively corresponding to the first through third programming times tPROG_1 through tPROG_3 as the peak information PEAK_INFO. The memory operation manager 224c may receive the peak information PEAK_INFO from the peak information memory 222c, and the power budget PB received by the memory operation manager 224c receives may have 200 mA set as a highest peak current value that may be allowed for the memory system 400. The memory operation manager 224c may determine data operation time considering a queue depth of the received data operation request set REQ_SET, and may generate different command signals CMDs based on the determined data operation time.

When the queue depth, which indicates the number of the data operation requests included in the received data operation request set REQ_SET, is greater than a threshold number of requests, the memory operation manager 224c may determine a longest period of data operation time as data operation time. It is assumed that the number of the data operation requests included in the data operation request set REQ_SET in FIG. 9C is equal to or greater than the threshold number of requests. For example, when the data operation request set REQ_SET such as presented in FIG. 9C is received, the memory operation manager 224c may determine a third programming time tPROG_3, which is the longest programming time, as programming time of the first nonvolatile memory die NVM_1 and the second nonvolatile memory die NVM_2. The memory operation manager 224c may transmit a command signal CMD corresponding to a next data operation request, within a range of remaining power budget. Consequently, the memory operation manager 224c may transmit the third programming operation command signal PGM_3 to the first nonvolatile memory die, transmit the third programming operation command signal PGM_3 to the second nonvolatile memory die, and transmit a reading operation command signal READ to the first nonvolatile memory die and the second nonvolatile memory die.

According to an example embodiment, when the number of the received data operation requests is equal to or greater than the threshold number of requests, the memory controller may determine a data operation time to have a greater value, thereby simultaneously transmitting command signals for several data operation requests. For example, the threshold number of requests may be set by a user of the user system 10, or may be preset.

Figure 10:
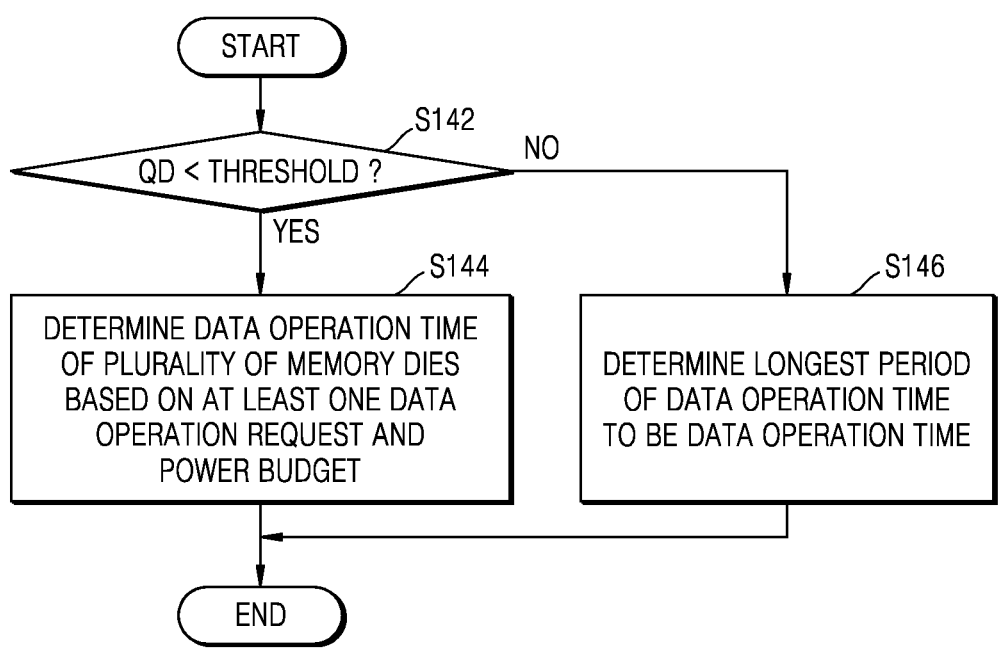
FIG. 10 illustrates a flowchart regarding determination of data operation times according to the embodiment of FIG. 9C.

FIG. 10 illustrates a flowchart regarding determination of the data operation time according to the embodiment in FIG. 9C. The memory controller 200 identifies the queue depth QD, which indicates the number of the data operation requests included in the received data operation request set REQ_SET.

The memory controller compares the queue depth QD and the threshold number of requests THRESHOLD (S142).

When the queue depth QD is less than the threshold number of requests THRESHOLD (Yes in S142), the memory controller 200 determines data operation times of the plurality of memory dies within the range of the power budget PB, such as described with reference to FIG. 9A (S144).

When the queue depth QD is equal to or greater than the threshold number of requests THRESHOLD (No in S142), the memory controller 200 determines a period of data operation time that is as long as possible as a data operation time (S146). For example, the memory controller 200 may determine the data operation times of the plurality of memory dies to be as long as possible according to the PEAK_INFO stored in the peak information memory 222c. By determining the data operation time to have a greater value, it is possible to control the memory dies to simultaneously perform several data operations.

Figure 11:
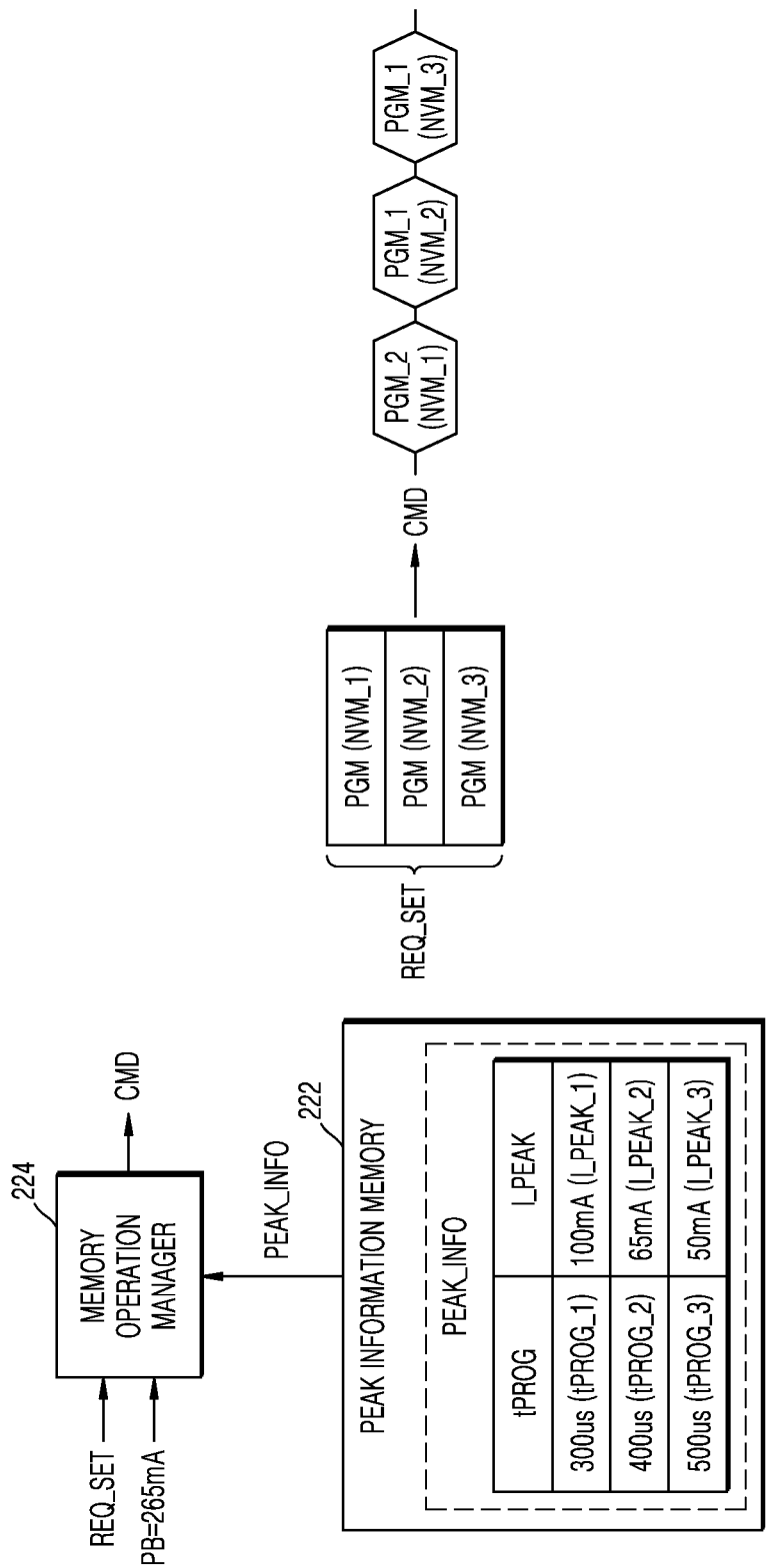
FIG. 11 illustrates operations of controlling the memory device according to an embodiment of the inventive concepts.

FIG. 11 illustrates operations of controlling the memory device 100 according to an embodiment of the inventive concepts. With respect to the data operation request set REQ_SET, the memory operation manager 224, the peak information memory 222, and the command signal CMD, description overlapping with that of FIGS. 5 through 7 may be omitted from the following. An amount of the power budget PB, the peak information PEAK_INFO, and the data operations request set REQ_SET presented in FIG. 11 are merely values and cases set for convenience of explanation about operations of the memory controller 200 which determines data operation time, and the inventive concepts are not limited to the values and cases presented in FIG. 11.

The peak information memory 222 may store the first through third peak current values I_PEAK_1 through I_PEAK_3 respectively corresponding to the first through third programming times tPROG_1 through tPROG_3 as the peak information. The memory operation manager 224 may receive the peak information PEAK_INFO from the peak information memory 222, and the power budget PB received by the memory operation manager 224 may have 265 mA as a highest peak current value that may be allowed for the memory system 400. The memory operation manager 224 may variably control the data operation time of the memory dies so that the data operations of the memory dies may be controlled within the power budget PB that is provided based on the received data operation request.

For example, the data operation request set REQ_SET may include a request to program the first nonvolatile memory die PGM (NVM_1), a request to program the second nonvolatile memory die PGM (NVM_2), and a request to program the third nonvolatile memory die PGM (NVM_3). The memory operation manager 224 may determine the number of the memory dies to be simultaneously programmed to be three. The memory operation manager 224 may determine a shortest period of operation time, in which the three memory dies may perform the programming operation within the power budget PB of 265 mA, to be the data operation time. For example, in order to efficiently use the provided power budget PB, the memory operation manager 224 may determine the three memory dies to have different data operation times.

The memory operation manager 224 may determine the second programming time tPROG_2 that corresponds to the second peak current I_PEAK_2, which is a highest peak current lower than 88.1 mA which is a value determined by the memory operation manager 224 by dividing 265 mA (the power budget PB) by 3 (the number of the memory dies to be simultaneously programmed), as the programming time of the first nonvolatile memory die NVM_1. After the determination, the memory operation manager 224 may control the two memory dies NVM_2 and NVM_3 other than the first nonvolatile memory die NVM_1 within a range of 200 mA, which is a value determined by the memory operation manager 224 by subtracting the second peak current I_PEAK_2 that is determined as the peak current flowing through the first nonvolatile memory die NVM_1 from the power budget PB. For example, the memory operation manager 224 may determine the first programming time tPROG_1 that corresponds to the first peak current I_PEAK_1, which is a highest peak current equal to or less than a value determined by the memory operation manager 224 by dividing 200 mA of the remaining power budget PB by 2 (the remaining number of the memory dies to be programmed), to be the programming time of the second nonvolatile memory die NVM_2, and may also determine the first programming time tPROG_1 to be the programming time for the third nonvolatile memory die NVM_3.

For example, the memory operation manager 224 in other words may determine a shortest data operation time in a range of power consumption that is less than a value determined by dividing the power budget PB by a number of the nonvolatile memory dies NVM_1, NVM_2 and NVM_3 to be simultaneously operated as a first data operation time of the first nonvolatile memory die NVM_1. The memory operation manager 224 may further determine a shortest data operation time in which the nonvolatile memory dies NVM_2 and NVM_3 may operate within a range of power consumption not greater than the power budget PB minus power consumption due to first nonvolatile memory die NVM_1 as data operation times of the nonvolatile memory dies NVM_2 and NVM_3.

Accordingly, the memory operation manager 224 may transmit the second programming operation command signal PGM_2 to the first nonvolatile memory die NVM_1, and transmit the first programming operation command signal PGM_1 to the second nonvolatile memory die NVM_2 and the third nonvolatile memory die NVM_3.

However, the determination of the specific programming times described with respect to FIG. 11 is merely an example of determining data operation times. As another example, the memory operation manager 224 may also determine the programming time of the second nonvolatile memory die NVM_2 or the third nonvolatile memory die NVM_3 as the second programming time tPROG_2. For example, when the plurality of memory dies are determined to have different data operation times, the memory operation manager 224 may also consider an amount of data written to each of the memory dies. For example, when the third nonvolatile memory die has a largest amount of data to be written among the first through third nonvolatile memory dies, the memory operation manager 224 may determine a programming time of the third nonvolatile memory die as the second programming time tPROG_2, and may determine programming time of the first and second nonvolatile memory dies as the first programming time tPROG_1.

In accordance with the embodiments described with respect to FIG. 11, the memory operation manager 224 may more efficiently use the provided power budget PB, by determining data operation times different from one another for each of the memory dies.

Figure 12:
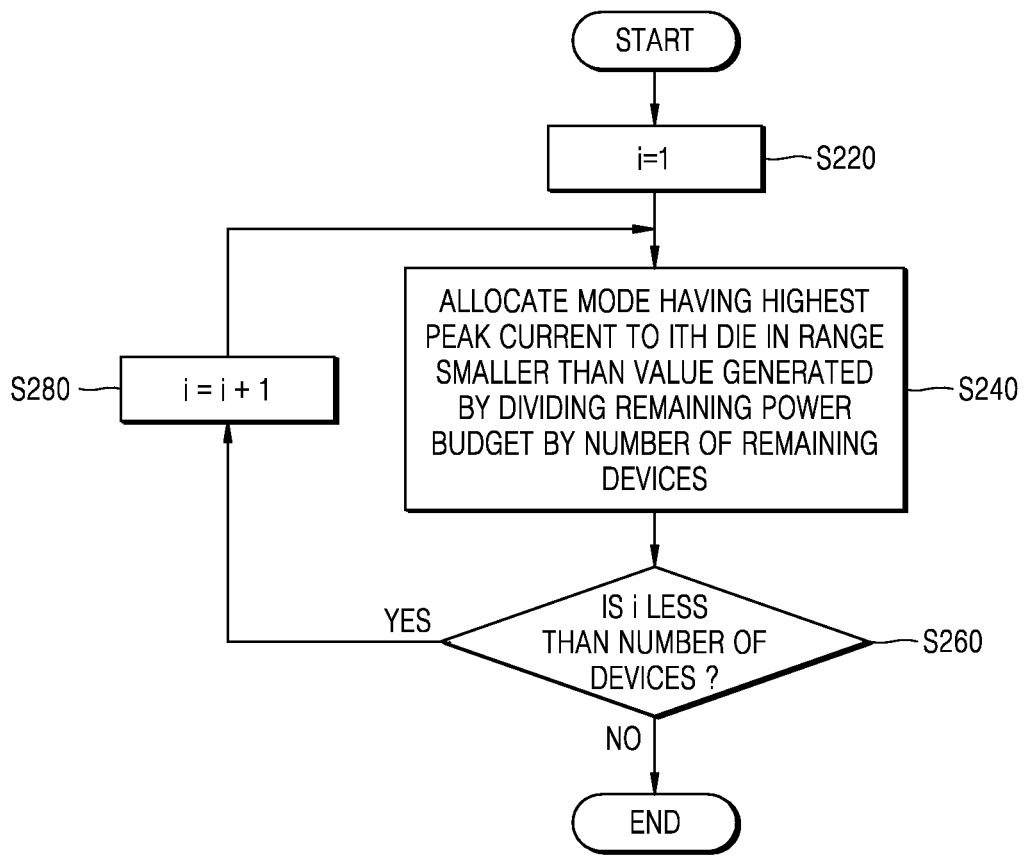
FIG. 12 illustrates a flowchart regarding determination of data operation mode according to the embodiment of FIG. 11.

FIG. 12 illustrates a flowchart regarding determination of data operation modes according to the embodiment in FIG. 11.

First, a natural number i is initialized to be 1 (S220). i may be equal to or greater than 1, and may be equal to or less than the number of the memory devices. The number of the memory devices may indicate the number of nonvolatile memory dies 120_1 through 120_n included in the memory system 400.

Within a range smaller than the value made by dividing the remaining power budget PB by the number of remaining devices, the memory controller 200 allocates a mode, which has a highest peak current, to an $i^{th}$ memory die (S240). In this case, for example, a programming mode that operates with the first programming time may be referred to as a first programming mode, and a programming mode that operates with the second programming time may be referred to as a second programming mode.

It is then determined whether a current value of i is less than the number of the devices to be simultaneously operated, or if the current value of i is equal to or greater than the number of the devices to be simultaneously operated (S260). For example, the current value of i the first time the process proceeds to S260 equals 1. A current value of i that is less than the number of the devices may indicate that data operation time for each of the memory dies is not yet determined, and the current value of i that is equal to or greater than the number of the devices may indicate that data operation time for each of the memory dies is determined.

When the value of i is less than the number of the devices to be simultaneously operated (Yes in S260), the value of i is increased (incremented) by 1 (S280). After S280, the operation of allocating the mode for the $i^{th}$ die (that is the die corresponding to the incremented current value of i) by using the remaining power budget may be performed again (S240).

When the value of i is equal to or greater than the number of the devices to be simultaneously operated (No in S260), determining of the data operation mode may be finished.

In the embodiment as described with respect to FIG. 12, the memory controller 200 may efficiently control the data operation time of the memory dies within the range of the provided power budget.

Figure 13:
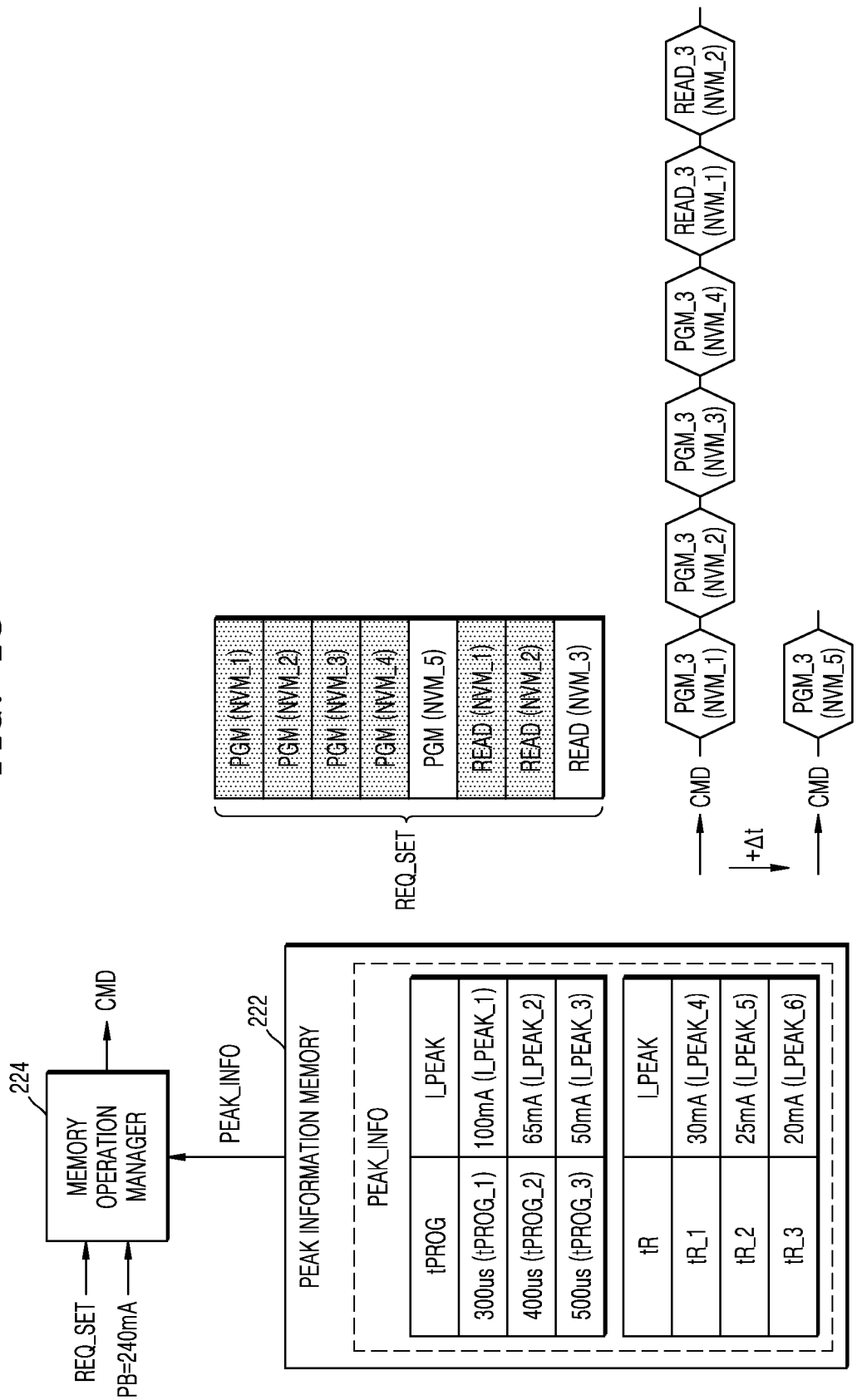
FIG. 13 illustrates operations of controlling the memory device according to an embodiment of the inventive concepts.

FIG. 13 illustrates operations of controlling the memory device 100 according to an embodiment of the inventive concepts. With respect to the data operation request set REQ_SET, the memory operation manager 224, the peak information memory 222, and the command signal CMD, description overlapping with that of FIGS. 5 through 7 may be omitted from the following. An amount of the power budget PB, the peak information PEAK_INFO, and the data operations request set REQ_SET presented in FIG. 13 are merely values and cases set for convenience of explanation about operations of the memory controller which determines the data operation time, and the inventive concept is not limited to the values and cases presented in FIG. 13.

The peak information memory 222 may store the values of the first through third peak currents I_PEAK_1 through I_PEAK_3 respectively corresponding to the first through third programming times tPROG_1 through tPROG_3, and values of fourth through sixth peak currents I_PEAK_4 through I_PEAK_6 respectively corresponding to first through third reading times tR_1 through tR_3 as peak information. The memory operation manager 224 may receive the peak information PEAK_INFO from the peak information memory 222, and the power budget PB received by the memory operation manager 224 may have 240 mA as a highest peak current value that may be allowed by the memory system 400. According to the data operation request set REQ_SET received by the memory operation manager 224, the memory operation manager 224 may variably determine the data operation time, and may generate command signals CMDs different from each other, based on the determined operation time.

For example, there may be a case where a total power consumption due to the first through $m^{th}$ data operations corresponding to first through $m^{th}$ data operation requests is greater than the power budget PB. In this case, m is a natural number equal to or greater than 2. However, if a total power consumption due to the first through m−$1^{th}$ data operations and the m+$1^{th}$ data operation is equal to or less than the power budget PB, and changing the orders of the $m^{th}$ data operation and the m+$1^{th}$ through m+$k^{th}$ data operations does not influence the memory device 100 in a way that should be avoided, the memory operation manager 224 may change the order of the $m^{th}$ operation and the m+1th through m+$k^{th}$ data operations. For example, the memory operation manager 224 may change the order of the $m^{th}$ data operation and the m+$1^{th}$ data operation with each other.

For example, when the first through fifth data operations are performed using the third programming time tPROG_3, a sum of the peak consumptions is 250 mA which is greater than 240 mA (the power budget PB). However, when the first through fourth data operations are performed using the third programming time tPROG_3, and the sixth through seventh data operations are performed using the third reading time tR_3, a sum of the peak currents may be 240 mA, which is equal to or less than 240 mA (the power budget PB). When changing orders of the fifth data operation PGM (NVM_5) and the sixth through seventh data operations does not influence the memory device 100 in a way that should be avoided, the memory operation manager 224 may change the orders of the fifth data operation and the sixth through seventh data operations. The memory operation manager 224 may transmit the third programming operation command signal PGM_3 to each of the first through fourth nonvolatile memory dies, and may transmit a third reading operation command signal READ_3 to the first and second nonvolatile memory dies. The fifth data operation PGM (NVM_5) may be performed after (e.g., a time+Δt after) the seventh data operation READ (NVM_2).

When changing order with respect to the data operation requests included in the received data operation request set REQ_SET does not influence the memory device 100, the memory operation manager 224 may more efficiently manage the provided power budget PB, by changing the order with respect to the data operation requests.

Figure 14:
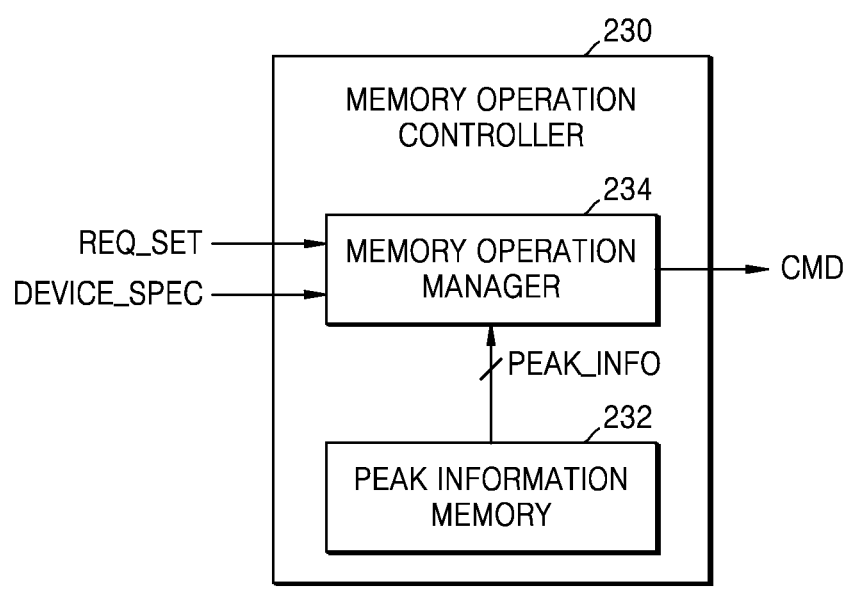
FIG. 14 illustrates a memory operation controller according to another embodiment of the inventive concepts.

FIG. 14 illustrates a memory operation controller 230 according to an another embodiment of the inventive concepts. The memory operation controller 230 includes a peak information memory 232 and a memory operation manager 234.

The peak information memory 232 may store peak information PEAK_INFO, and may provide the stored peak information PEAK_INFO to the memory operation manager 234. The peak information PEAK_INFO may include information regarding peak currents or peak voltages of the memory dies 120_1 through 120_n controlled by the memory controller 200. For example, the peak information PEAK_INFO may include information regarding the peak currents or the peak voltages according to the data operation time of the memory dies 120_1 through 120_n. The peak information PEAK_INFO may include information regarding peak currents or peak voltages according to the data operation time of the memory dies 120_1 through 120_n, for example, a data table indicating information regarding peak current values or peak voltage values corresponding to m (m is a natural number) data operation times. The peak information memory 232 may be a separate memory component, but is not limited thereto. For example, the peak information memory 232 may include any component or be a part of an arbitrary memory in the memory controller 200 that stores the peak information PEAK_INFO. The functionality of the peak information memory 232 and content of the peak information PEAK_INFO in the embodiment of FIG. 14 may be similar to that described with respect to FIG. 6.

The memory operation manager 234 may receive the peak information PEAK_INFO from the peak information memory 232, may variably determine data operation time based on the received data operation request set REQ_SET and a device specification DEVICE_SPEC, and may generate command signals CMDs based on the determined data operation time. The device specification DEVICE_SPEC may indicate a widest power spectrum of memory devices. For example, the memory devices may be memory dies such as the memory dies 120_1 through 120_n as described with respect to FIG. 1. The widest power spectrum may be a greatest value of power which may be simultaneously used by the memory dies 120_1 through 120_n, but is not limited thereto. For example, the widest power spectrum may also indicate a highest peak current or a highest peak voltage that may be simultaneously allowed. The device specification DEVICE_SPEC may have a different value for each of the memory dies 120_1 through 120_n, and may be a value stored in the memory controller 200. Compared to the memory operation manager 224 in FIG. 5, the memory operation manager 234 of the embodiment described with respect to FIG. 14 may determine data operation times by considering the device specification DEVICE_SPEC, instead of the power budget received from the host. For example, the memory operation manager 234 of the embodiment described with respect to FIG. 14 may determine data operation times to have the memory dies 120_1 through 120_n perform data operations within a range not greater than the respective permissible consumption power.

Figure 15:
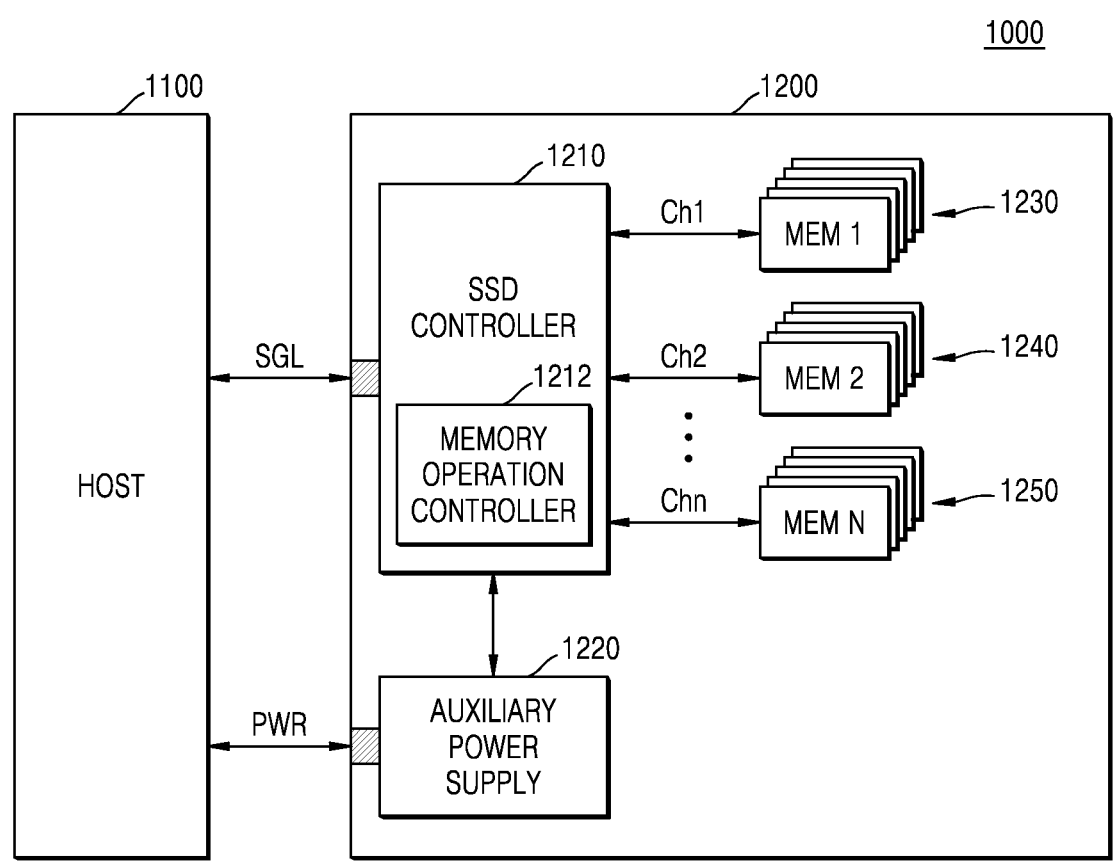
FIG. 15 illustrates a solid state drive (SSD) system according to an embodiment of the inventive concepts.

FIG. 15 illustrates a solid state drive (SSD) system 1000 according to an embodiment of the inventive concepts.

The SSD system 1000 includes a host 1100 and an SSD 1200. The SSD 1200 may exchange signals SGL with the host 1100 through a signal connector, and may receive input power PWR from a power connector. The SSD 1200 may include an SSD controller 1110, an auxiliary power supply 1220, and a plurality of memory devices 1230, 1240 and 1250. In this case, the SSD may be implemented by using the embodiments described in FIGS. 1 through 14.

More particularly, the SSD controller 1210 may include a memory operation controller 1212. The memory operation controller 1212 may determine data operation time of the data operations performed in the plurality of memory devices 1230, 1240, and 1250, based on the data operation request set REQ_SET and the power budget PB (not shown) received from the host 1100. The memory operation controller 1212 may store a value of a peak current or a peak voltage corresponding to the data operation time as peak information, and may use the peak information to determine the data operation time. The SSD controller 1210 may generate a command based on the determined data operation time and control the plurality of memory devices 1230, 1240, and 1250 via respective channels CH1, CH2 and CHn.

While the inventive concepts have been particularly shown and described with reference to embodiments thereof, it will be understood that various changes in form and details may be made therein without departing from the spirit and scope of the following claims. Accordingly, the true technical scope of the inventive concepts is defined by the technical spirit of the appended claims.

What is claimed is:

1. A method of controlling memory devices by a memory controller, the memory devices comprising a plurality of memory dies, the method comprising:
receiving, by the memory controller, at least one data operation request and a power budget from external of the memory controller;
determining, by the memory controller, data operation times of the plurality of memory dies, such that power consumption due to at least one data operation in response to the at least one data operation request is equal to or less than the power budget; and
controlling, by the memory controller, the plurality of memory dies based on the data operation times,
wherein the determining the data operation times comprises
determining memory dies to simultaneously operate from among the plurality of memory dies, according to the at least one data operation request, and
determining a shortest period of operation time in which the memory dies determined to simultaneously operate may operate within the power budget as the data operation times.

2. The method of claim 1, wherein the power budget indicates an acceptable highest peak current value or an acceptable highest peak voltage value, and
the determining the data operation times comprises using peak information stored in the memory controller,
wherein the peak information indicates values of peak currents or values of peak voltages according to data operation times stored in the memory controller as the peak information.

3. The method of claim 2, wherein the determining the data operation times comprises determining the data operation times such that a sum of peak current values or a sum of peak voltage values of the plurality of memory dies performing the at least one data operation is equal to or less than the power budget.

4. The method of claim 1, wherein the determining the shortest period of operation time comprises:
determining the shortest period of operation time in which the memory dies determined to simultaneously operate may operate as the data operation times based on operations currently performed on the plurality of memory dies, and so that power consumption of the memory dies determined to operate simultaneously is within a range not greater than the power budget minus power consumption due to the operations currently performed.

5. The method of claim 1, wherein the determining the shortest period of operation time comprises:
determining a first shortest data operation time in a range of power consumption that is less than a value determined by dividing the power budget by a number of the memory dies that simultaneously operate as a first data operation time of a first memory die from among the memory dies that simultaneously operate; and
determining a second shortest data operation time in which memory dies from among the memory dies that simultaneously operate other than the first memory die may be operated, within a range of power consumption not greater than the power budget minus power consumption due to the first memory die as data operation times of the memory dies that simultaneously operate other than the first memory die.

6. The method of claim 2, wherein the determining the data operation times comprises:
determining a longest period of data operation time, from among the data operation times stored in the memory controller as the peak information, as the data operation times of the plurality of memory dies, in response to a number of the at least one data operation request being equal to or greater than a threshold number of requests.

7. The method of claim 1, wherein the at least one data operation request comprise m+1 data operation requests, and
during the determining the data operation times of the plurality of memory dies, in response to a sum of power consumption due to first through $m^{th}$ data operations in response to the m+1 data operation requests exceeding the power budget, when a sum of power consumption due to first through m−1 data operations and an m+1 data operation is equal to or less than the power budget, an order of the $m^{th}$ data operation and the $m+1^{th}$ data operation are changed with each other,
wherein m is a natural number equal to or greater than 2.

8. The method of claim 1, wherein the determining the data operation times comprises:
increasing the data operation times of the plurality of memory dies when a queue depth indicating a number of the at least one data operation request increases.

9. The method of claim 1, wherein the at least one data operation comprises a programming operation with respect to the memory devices, and the data operation times of the plurality of memory dies comprise programming times.

10. The method of claim 1, wherein the controlling the plurality of memory dies comprises the memory controller transmitting command signals corresponding to the data operation times of the plurality of memory dies to the plurality of memory dies.

11. A storage device comprising:
a plurality of nonvolatile memory dies; and
a memory controller configured to receive a power budget and programming requests from external of the memory controller, and to transmit command signals different from each other to the plurality of nonvolatile memory dies based on the power budget and a number of the programming requests,
wherein the memory controller is configured to determine programming times of the plurality of nonvolatile memory dies so that the determined programming times increase as a queue depth indicating the number of the programming requests increases, and to generate the command signals based on the determined programming times.

12. The storage device of claim 11, wherein the power budget indicates a highest value of peak current allowed for the storage device, and
the memory controller is configured to store peak information comprising peak currents according to programming times of the nonvolatile memory dies.

13. The storage device of claim 12, wherein the memory controller is configured to determine the programming times of the nonvolatile memory dies to maintain power consumption of the nonvolatile memory dies within a range of the power budget by using the peak information, and to generate the command signals based on the programming times.

14. The storage device of claim 13, wherein the memory controller is configured to determine the programming times within the range of the power budget minus power consumption due to data operations currently performed on the plurality of nonvolatile memory dies.

15. The storage device of claim 13, wherein the memory controller is configured, in response to the number of the programming requests being equal to or greater than a threshold number of requests, to determine a programming time from among the programming times stored as the peak information that has a longest period as the programming times of the plurality of nonvolatile memory dies.

16. The storage device of claim 13, wherein the memory controller is configured to generate the command signals as respectively comprising a programming command signal and one of different mode signals according to a determined programming time.

17. A method of controlling memory devices by a memory controller, the memory devices comprising a plurality of memory dies, the method comprising:
receiving, by the memory controller, at least one data operation request from external of the memory controller;
determining, by the memory controller, data operation times of the plurality of memory dies, wherein power consumption due to at least one data operation according to the at least one data operation request is based on permissible consumption powers of the plurality of memory dies; and
controlling, by the memory controller, the plurality of memory dies based on the determined data operation times,
wherein the determining the data operation times comprises increasing the data operation times when a queue depth indicating a number of the at least one data operation request increases.

* * * * *